United States Patent [19]

Alpha et al.

[11] Patent Number: 5,534,321
[45] Date of Patent: Jul. 9, 1996

[54] DISK SUBSTRATE FOR MAGNETIC MEMORY DEVICES

[75] Inventors: James W. Alpha, Corning; Nicholas F. Borrelli, Elmira, both of N.Y.

[73] Assignee: Corning Incorporated, Corning, N.Y.

[21] Appl. No.: 176,432

[22] Filed: Jan. 3, 1994

Related U.S. Application Data

[63] Continuation-in-part of Ser. No. 63,768, May 20, 1993, abandoned.

[51] Int. Cl.[6] ............................. G11B 5/66; B32B 3/02; B32B 3/10
[52] U.S. Cl. ................... 428/64.2; 428/65.3; 428/141; 428/325; 428/426; 428/428; 428/471; 428/408; 428/694 ST; 428/694 SG; 428/694 TR; 428/694 BR; 428/900; 360/133; 360/135
[58] Field of Search ............... 428/694 ST, 694 SG, 428/141, 64.2, 65.3, 325, 426, 428, 471, 408, 694 TR, 694 BR, 900; 360/133, 135

[56] References Cited

U.S. PATENT DOCUMENTS

| | | | |
|---|---|---|---|
| 2,628,160 | 2/1953 | Stookey | 216/87 |
| 4,971,932 | 11/1990 | Alpha | 501/3 |
| 4,996,622 | 2/1991 | Takatsuki | 360/135 |
| 5,093,173 | 3/1992 | Nakagawa | 428/65.4 |
| 5,268,207 | 12/1993 | Kruger | 427/560 |
| 5,328,740 | 7/1994 | Nakayama | 428/64.3 |

FOREIGN PATENT DOCUMENTS 2146109  8/1990  Japan.

*Primary Examiner*—Leszek Kiliman
*Attorney, Agent, or Firm*—Milton M. Peterson

[57] ABSTRACT

This invention is directed to the fabrication of substrates for rigid information disks for use in a magnetic storage device, the surface of the substrate comprising a smooth area and a low friction area. Conveniently, the substrate will comprise a photonucleable glass wherein the low friction area will have a controlled textured surface.

9 Claims, 1 Drawing Sheet

DISK SUBSTRATE FOR MAGNETIC MEMORY DEVICES

This application is a continuation-in-part of application Ser. No. 063,768, filed May 20, 1993, now abandoned.

BACKGROUND OF THE INVENTION

U.S. Pat. No. 4,971,932 (Alpha et al.) describes the fabrication of memory storage devices consisting essentially of a head pad and a rigid information disk, which disk consists essentially of a rigid substrate having a coating of magnetic media on the surface thereof facing the head pad. That patent is particularly directed to materials especially designed for use as the substrate for the disk. Two different groups of glass-ceramics are disclosed for that purpose: glass-ceramics containing a sheet silicate as the predominant crystal phase and glass-ceramics containing a chain silicate as the predominant crystal phase. With respect to glass-ceramics containing sheet silicate crystals, the patent claims crystals consisting of predominantly fluoro-phlogopite solid solution or predominantly tetrasilicic fluormica. With respect to glass-ceramics containing chain silicate crystals, the patent claims crystals consisting of predominantly canasite, predominantly potassium fluorrichterite, or predominantly potassium fluorrichterite, but with a substantial amount of cristobalite.

The patent noted that aluminum metal comprised the most used substrate for the disk, but pointed out certain inherent weaknesses in the use of aluminum as the substrate. For example, the patent observed that the substrate ought to exhibit the following three properties:

(a) a surface highly resistant to scratches to withstand frequent takeoffs and landings;

(b) high strength and be sufficiently rigid to allow the production of very thin disks (<1 mm thickness) which are dimensionally stable during speeds of rotation up to 7200 rpm; and (c) a surface having a slight uniform texture, i.e., an average roughness of about 1–6 nm, in order to provide a suitably low coefficient of "stiction" which is a measure of the interaction between a head and a disk leading to enhanced magnetics and lower flying height.

As was stated in the patent, the claimed glass-ceramics exhibited very high body strengths and fracture toughnesses, that combination of properties enabling the manufacture of very thin, rigid disks of about 0.5–0.6 mm thickness. Furthermore, the glass-ceramics displayed a much harder surface than aluminum metal (Knoop hardness >500 compared with <100 for aluminum. Finally, the inherently textured surface of the glass-ceramics can be of special value because no texturizing operation may be required, either chemical or mechanical, to bring the surface in condition for application of the magnetic medium. That factor was cited as providing cost savings in that the surface of aluminum (or glass) disks would have to be treated to provide the desired texture therein. Of course, the surface texture of the glass-ceramic surfaces can be tailored to a particular average roughness value through minor adjustments in base composition or through standard grinding and polishing or chemical etching.

The development of simplifying software created user friendly computing which initiated explosive market growth in computers. The continued rapid development of software has fueled demand for more magnetic rigid disk memory, i.e., increased capacity per disk. As a result, the requirements for the media substrate are changing rapidly. Higher areal density, i.e., increased bit and track density, results in smaller bit cell size. Therefore, in order to read and write data, the recording heads must fly closer to the surface of the disk. As a consequence, the characteristics of the substrate become even more critical with the trend being to flatter, smoother surfaces.

As the recording head moves closer to the media, it is essential that the coefficient of friction of the substrate/media surface be low. The characteristics that lead to low friction, i.e., low bearing area and surface roughness, are in conflict with surface characteristics that promote low glide, low noise, and high bit densities, i.e., smooth and flat surfaces. As a result, this conflict causes compromises to be made in surface design, i.e., not too smooth to cause frictional problems, but sufficiently smooth to foster low glide.

The primary objective of the present invention was to devise a substrate that provides a combination of low friction and low glide.

SUMMARY OF THE INVENTION

The fundamental concept underlying the present invention comprises a substrate having a surface divided into two parts: (1) a smooth area, i.e., exhibiting a $R_{PV}$ value less than about 10 nm, to optimize media performance by providing low glide and flying height, low noise, and high data density; and (2) a low friction area, i.e., exhibiting a $R_{PV}$ value greater than about 10 nm, conventionally up to about 50 nm, to serve as a place to park the recording head during inactivity (the off condition). In order to reduce that concept to practice, research was undertaken to discover a substrate material capable of being treated such that the two required surface textures could be produced in the same part with the proviso that a facile transition can be had from the data zone (the smooth area) to the low friction landing zone (the area exhibiting a $R_{PV}$ value greater than 10 nm) that does not negatively affect the flying characteristics of the recording head as it transitions from one zone to the other.

It was appreciated that a substrate with two zones of surface roughness could be produced through complex, time-consuming, and costly cutting, grinding, and polishing techniques. The goal of the present invention, however, was to develop a method wherein such mechanical practices would not have to be employed. Success in achieving that goal lay in utilizing a material for the substrate demonstrating characteristics enabling it to be treated in a relatively rapid and simple operation to produce those two textural areas in a single body. We have found that photonucleable glasses, such as are described in U.S. Pat. No. 2,628,160 (Stookey), comprise an especially useful field of glass compositions exhibiting properties rendering them particularly useful for achieving the desired goal.

That patent describes photonucleable glasses which are capable of being chemically sculptured. That is, the glass compositions disclosed in that patent are susceptive to the development of opacification in selected areas thereof because of the generation of crystals therein by means of the selective radiation of those areas by shortwave radiation (conventionally ultraviolet radiation) for a period of time sufficient to develop a latent image therein, followed by a heat treatment at a temperature between the annealing point and the softening point of the glass to develop nuclei upon which crystals grow. The patent emphasizes that the great difference in solubility in particular solutions existing between the crystal phase and the original glass, i.e., the uncrystallized glass, results in the ready etching of the crystalline regions.

GENERAL DESCRIPTION OF THE INVENTION

Figures 1, 2:
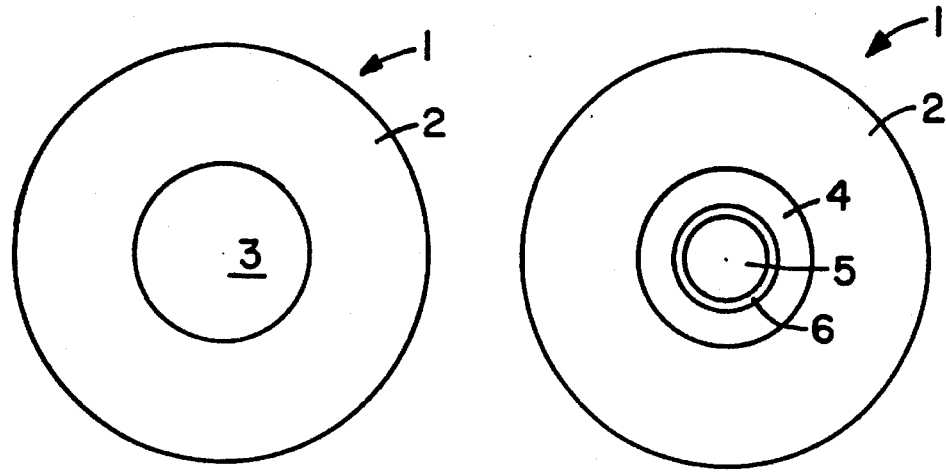
FIG. 1 is a schematic top plan view of a substrate for an information disk illustrating the pattern of a masked region and an unmasked region adjacent to one another prior to exposure to shortwave radiation, said masked region to become the smooth area of said substrate and said unmasked region to contain the low friction area of said substrate.
FIG. 2 is a schematic detailed top plan view of an information disk illustrating the pattern of smooth and low friction areas adjacent to one another surrounding a circular orifice in the center of the disk.

FIG. 1 depicts the outline of a desired substrate, generally defined as 1, prepared from a photonucleable glass prior to the photonucleating process, said substrate fundamentally comprising a masked portion 2 surrounding unmasked portion 3. As will be illustrated below, said masked portion 2 will constitute the smooth area of the final substrate and unmasked portion 3 will contain the low friction area of the finished substrate.

Figure 3:
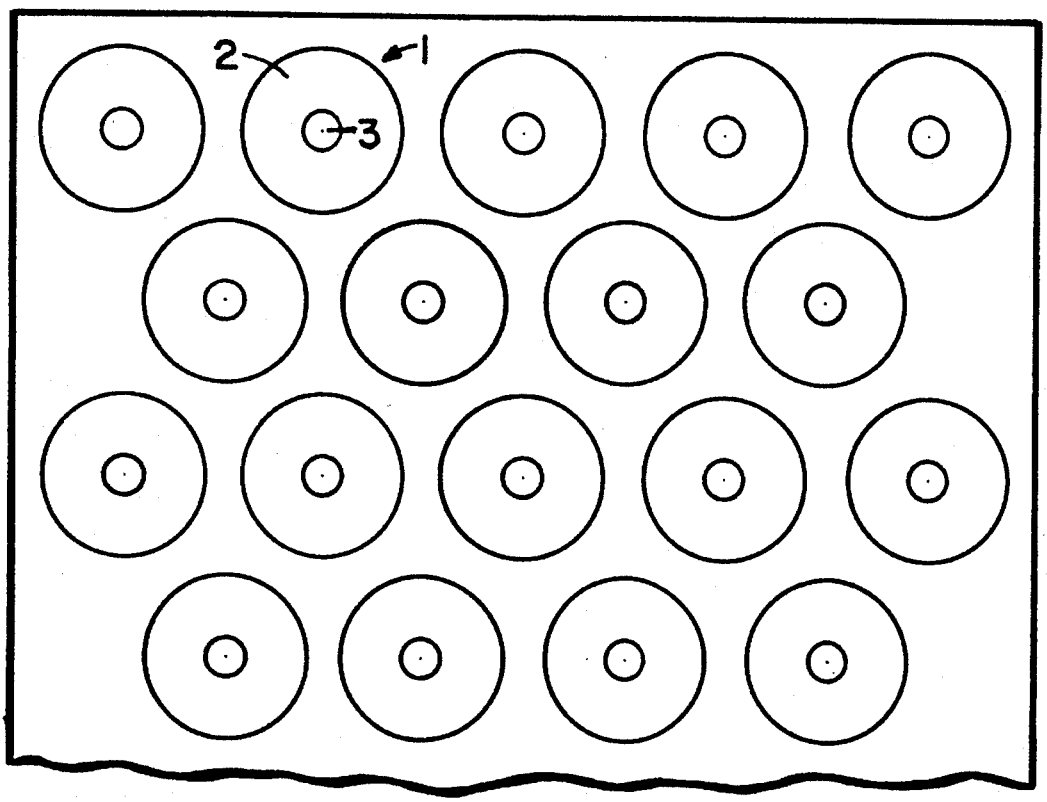
FIG. 3 is a schematic top plan view of repeated patterns of masked and unmasked regions adjacent to one another in a glass sheet prior to their being fabricated into substrates for information disks.

The method for fabricating the substrate comprises the following basic steps:

(a) A photonucleable glass article having the desired areal and thickness dimensions (most commonly the article will be in sheet form in order to prepare repeated disks thereon as pictured in FIG. 3) is exposed in selected region 3 to shortwave radiation as is explained in U.S. Pat. No. 2,628,160 for a period of time sufficient to develop a latent image therein. The exposure to shortwave radiation will commonly be conducted through masking means, typically employing photolithographic procedures. In the case of a single substrate, only region 3 will be subjected to shortwave radiation. Where a plurality of substrates are to be prepared from a glass sheet, such as portrayed in FIG. 3, it is more practical to expose the entire sheet such that the glass between the designed substrates will also be treated with shortwave radiation.

(b) The selected exposed area 3 is heat treated at a temperature between the annealing point and the softening point of the glass for a sufficient period of time to cause the generation of nuclei in the glass followed by the growth of crystals on the nuclei in the previously-exposed area. The size and number of crystals developed are principally dependent upon the time and temperature of the heat treatment. Although only the exposed area requires heat treatment, it is usually more practical to subject all of substrate 1, or the entire sheet of substrates as in FIG. 3, to the heat treatment, inasmuch as the unexposed glass, i.e., region 2, is not deleteriously affected thereby.

(c) The exposed and heat treated area 3 of the sheet is contacted with an etchant for a sufficient period of time to preferentially remove a very thin surface layer of the relatively soluble, crystal containing glass and leave a surface sufficiently roughened to produce low friction area 3. As in the heat treatment procedure described in Step (b) above, the etchant solution may be applied to the crystallized areas only of substrate 1. However, it is usually more practical to contact the entire area of substrate 1, including glassy region 2. Accordingly, an etchant is chosen which does not substantially attack the unexposed glass.

Where the photonucleable glass is a silicate glass, hydrofluoric acid is preferably employed as the etchant. The etching procedure represents a compromise between minimizing etching of the untreated glass 2 and securing the desired roughness in the exposed area 3. A gaseous atmosphere of HF may be employed, but this requires a longer time. A much faster procedure involves immersion in a dilute HF solution, but this procedure requires greater care to secure the desired effect.

The key to success of the process lies in the differential etching rate between the parent exposed and undeveloped glass of area 4 and the exposed and developed glass of area 3. Both are subject to some degree of solubility, particularly where HF is employed as the etchant. However, the exposed and developed area 3 will etch at a rate 20–50 times as fast as the virgin glass of area 4. Thus, the roughened surface desired on area 3 can be produced with minimal effect on the smoothness of area 4 if proper care is taken.

Where excess glass is present, as in the sheet of FIG. 3, it is convenient to remove such excess glass, as well as that in hub 5, by converting the glass to the crystallized, relatively soluble state and removing by etching. In that case, the area shown as 4 in FIG. 2, and preferably also that shown as 2, will be masked. The masking substance chosen will be a commercially available material that is insoluble in the etchant employed. Thus, the masking substance will depend on the etchant. We prefer etching by immersion in an HF solution.

With the indicated areas masked, the entire sheet is then subjected to the etching solution for a sufficient time to remove the excess glass. This leaves a disk 1 as shown in FIG. 2 which is then washed to remove etchant material and dried.

The preferred photonucleable glass compositions are those disclosed in U.S. Pat. No. 2,628,160, supra, which consist essentially, expressed in terms of weight percent on the oxide basis, of 9–15% $Li_2O$, 0–8% $Na_2O$, 0–8% $K_2O$, 0–8% $Na_2O+K_2O$, 9–23% $Li_2O+Na_2O+K_2O$, 70–85% $SiO_2$, and 0.001–0.020% Ag, computed as AgCl, and/or 0.001–0.03% gold, computed as Au, the sum of $Li_2O+Na_2O+K_2O+SiO_2+Ag+Au$ constituting at least 84% of the total composition, and up to 10% $Al_2O_3$ and up to 0.05% $CeO_2$.

The use of photoresists for masking areas of photonucleable glass articles is well known in the art and such products are widely marketed commercially. In the glass compositions of U.S. Pat. No. 2,618,160 the crystals developed via exposure to shortwave radiation followed by heat treatment generally consist essentially of lithium metasilicate and/or lithium disilicate. With the glasses of U.S. Pat. No. 2,628,160 the etchant solution will customarily consist of an aqueous acid solution which will typically be composed of dilute hydrofluoric acid or hydrofluoric acid in combination with another mineral acid. Therefore, low friction area 4 will conveniently be covered with a commercially marketed acid resist material prior to contacting substrate 1 with the etchant solution.

The very narrow ring of glass 6 pictured in FIG. 2 is an artifact of the forming process to assure that orifice 5 will be a perfect circle and that there will be no undercutting of low friction area 4 during the etching process. It constitutes no substantive feature of the invention.

DESCRIPTION OF PREFERRED EMBODIMENTS

Samples of substrate disks were prepared from a sheet of photonucleable, crystallizable, lithium silicate glass having a composition within the scope of U.S. Pat. No. 2,628,160 and marketed by Corning Incorporated, Corning, N.Y., as Code 8603. That glass has the following approximate composition, expressed in terms of parts by weight on the oxide basis, except for the Au and Ag concentrations which are reported in terms of the metal. (Because the sum of the individual components closely approaches 100, for all practical purposes the recited values may be considered to reflect weight percent.)

| | | | | | |
|---|---|---|---|---|---|
| $SiO_2$ | 79.1 | $Al_2O_3$ | 4.2 | Ag | 0.115 |
| $Li_2O$ | 9.4 | ZnO | 1.0 | $CeO_2$ | 0.015 |
| $Na_2O$ | 4.2 | $Sb_2O_3$ | 0.4 | SnO | 0.003 |
| $K_2O$ | 4.2 | Au | 0.0012 | | |

The glass sheet had a thickness of about 1 mm. The glass sheet was selectively exposed to collimated ultraviolet light through a photographic mask for about 1–15 minutes to develop latent images in the glass sheet in the circular concentric patterns represented in FIGS. 1 and 2. The photographic mask was removed and the glass sheet exposed to the following heat treatment:

(a) heated from room temperature (R.T.) to about 500° C., the rate of heating being unimportant;

(b) heated to a temperature within the range of about 575°–625° C. at a sufficiently slow rate, e.g., ~1°–2° C./minute, to cause the generation of nuclei in the glass;

(c) held within that temperature range for a period of time sufficient to grow crystals of a desired size on the nuclei with times ranging about 0.25–4 hours, depending upon the temperature employed, and then (d) annealed to room temperature.

It will be recognized that crystallization takes place more rapidly at higher temperatures so longer exposure times will be required at lower temperatures. Nevertheless, the growth of crystals can be more carefully controlled at lower temperatures. Hence, the economics of short exposure times must be balanced against the need for close control of crystal growth. Accordingly, an exposure period of about one hour at 600°–610° C. has been deemed to comprise the preferred practice. Likewise, a nucleation period of about 0.75–1 hour, i.e., the time within the nucleation range (500°–575° C.), is considered to comprise the preferred practice.

Thereafter, a commercially marketed acid resist masking agent was applied to circular area 4 defining the low friction landing zone and the sheet was immersed into an aqueous etchant bath consisting of 13% by weight hydrofluoric acid for about 10 minutes to one hour. The unmasked crystal-containing areas defining the outside diameter and center orifice were etched through from both sides, resulting in a disk having very precise inside and outside diameters. It will be appreciated that, as observed above, various etchant solutions can be employed. Likewise, the concentrations of the etchants can be varied to assure removal of the crystalline areas without substantively affecting the glass areas. Hence, it will be recognized that more dilute solutions of HF, e.g., 5–6% can be utilized, but the time necessary for the etching operation to be complete will be longer, e.g., up to 2–3 hours. The use of an aqueous 13% HF solution has been found to be especially effective in dissolving the crystals formed in the materials of the present invention.

The disk was withdrawn from the bath, the etchant rinsed off in tap water, and the acid resist masking agent stripped off the landing zone area.

The disks thus produced had a 65 mm OD. The disk ID, created by hub 5, was 20 mm. The exposed and developed area 3, adjacent hub 5, designed to become low friction, roughened region 3, was a 10 mm wide, annular region.

Sample disks were then exposed to different etching treatments. Thereafter, the samples were washed, dried and etch depth measurements made with a WYCO profiler instrument available from The WYCO Company. The etch depth measurements of roughness were recorded in three different terms recognized in the art. These were: root mean square (RMS), average roughness ($R_a$) and peak-to-valley ($R_{PV}$), all in nanometers.

The RMS and $R_a$ values are similar with the $R_a$ usually being somewhat smaller. In general, acceptable values are in the range of one to six. The $R_{PV}$ values represent the difference in extremes along a path. They tend to be greater than the RMS and $R_a$ values by a factor of about ten. accordingly, acceptable values for roughened area 3 are generally greater than ten and may range up to about 50.

The following three etching procedures were employed:

1. A sample was mounted in the gaseous atmosphere above a 6% HF solution and exposed for a period of one hour.

2. A sample was dipped in a 6% HF solution for 5 seconds and immediately washed.

3. A sample was dipped in a 13% HF solution for 5 seconds and washed.

These procedures were of a preliminary nature, and designed primarily for screening purposes. The measurements indicated that the first and third treatments were too severe for present purposes.

Additional sample disks were prepared for testing. In preparing these samples, the standard radiation and thermal development process for the photonucleable glass was modified to determine the effects of these variables. Modifications included exposing the glass to radiation for shorter and longer times than the standard, as well as doubling the period of heat treatment. Measurements indicated that, while the processing changes did affect the values somewhat, the effects were not sufficient to warrant changing the standard processing schedule.

The following TABLE sets forth selected typical measurements on disks prepared under the varying exposure and development conditions. Measurements are recorded in each of the three standard forms.

TABLE

| Sample | Exposure | Heat Treat | Etch | RMS | $R_a$ | $R_{PV}$ |
|---|---|---|---|---|---|---|
| A | Standard | Standard | Immerse - 5 sec. | 1.40 | 1.05 | 21.2 |
| B | Standard | Standard | Atm. - 20 min. | 2.76 | 2.13 | 39.8 |
| C | Standard | Double | Immerse - 5 sec. | 1.79 | 1.38 | 25.1 |
| D | Standard | Double | Atm. - 20 min. | 4.30 | 2.72 | 41.8 |
| E | Over Expose | Standard | Immerse - 5 sec. | 1.23 | 1.00 | 9.4 |
| F | Over Expose | Standard | Atm. - 20 min. | 4.20 | 2.82 | 48.6 |

Both etching procedures employed a 6% solution of HF. One procedure involved immersion of the sample in the acid solution for 5 seconds. The other involved exposure in a gaseous HF atmosphere (Atm.) above the 6% solution for a period of twenty minutes.

It has become apparent that cleanliness is important in obtaining consistent results. Since the samples employed were not prepared in a clean room, the values are at best approximations. However, they do show that degree of roughness required for the low friction region can be attained. It appears that changes in the standard exposure and development conditions do not provide any substantial improvement, and that the standard conditions are quite adequate. We do consider the 5 second immersion etching procedure superior to the fogging or atmospheric etching procedure.

I claim:

1. A glass substrate for a rigid information disk in a magnetic storage device, said substrate having a circular orifice in the center thereof, having a first circular region surrounding said orifice and a second circular region surrounding said first circular region, each region having an upper surface, said first circular region having crystals dispersed in a glassy matrix and having a selectively etched, upper surface that exhibits a $R_{PV}$ value greater than 10 nm, said second circular region being essentially crystal-free and having an upper surface that exhibits a $R_{PV}$ value less than 10 nm, whereby, when said substrate is used in a magnetic storage device comprising a head pad and a rigid information disk, the first circular region is the landing zone for the head pad and the second circular region comprises the: data containing region.

2. A substrate according to claim 1 wherein magnetic material covers at least the upper surface of said second circular region.

3. A substrate according to claim 1 comprising a photonucleable glass.

4. A substrate according to claim 1 wherein said crystals consist essentially of lithium metasilicate and/or lithium disilicate.

5. A substrate according to claim 3 wherein said second circular region consists of an uncrystallized portion of said photonucleable glass and said first circular region consists of that portion of the etched upper surface of said photonucleable glass having crystals developed therein.

6. A substrate according to claim 3 wherein said photonucleable glass composition consists essentially, expressed in terms of weight percent on the oxide basis, of components within the ranges 9–15% $Li_2O$, 0–8% $Na_2O$, 0–8% $K_2O$, 0–8% $Na_2O+K_2O$, 9–23% $Li_2O+Na_2O+K_2O$, 70–85% $SiO_2$, and 0.001–0.020% Ag, computed as AgCl, and/or 0.001–0.03% gold, computed as Au, the sum of $Li_2O+Na_2O+K_2O+SiO_2+Ag+Au$ constituting at least 84% of the total composition, and up to 10% $Al_2O_3$ and 0–0.05% $CeO_2$.

7. A rigid information disk in a magnetic memory storage device comprising a glass substrate with a coating of a magnetic layer on an upper surface thereof, in which said substrate has a circular orifice in the center thereof, has a first circular region having crystals dispersed in a glassy matrix and having a selectively etched, upper surface that exhibits a $R_{PV}$ value greater than 10 nm, said second circular region being essentially crystal-free and having an upper surface that exhibits a $R_{PV}$ value less than 10 nm, whereby, when said substrate is used in a magnetic storage device comprising a head pad and a rigid information disk, the first circular region is the landing zone for the head pad and the second circular region comprises the data containing region.

8. A rigid information disk according to claim 7 wherein said substrate comprises of a photonucleable glass.

9. A rigid information disk according to claim 8 wherein said second circular region of said substrate consists of an uncrystallized region of said photonucleable glass and said first circular region of said substrate consists of that portion of the etched upper surface of said photonucleable glass having crystals developed therein.

* * * * *